US00RE36117E

United States Patent [19]

Bornstein et al.

[11] E Patent Number: Re. 36,117

[45] Reissued Date of Patent: Mar. 2, 1999

[54] VANADIUM CORROSION INHIBITOR

[75] Inventors: Norman S. Bornstein, West Hartford; Hilton A. Roth, Cheshire; Roscoe A. Pike, Granby, all of Conn.

[73] Assignee: United Technologies Corporation, Hartford, Conn.

[21] Appl. No.: 34,804

[22] Filed: Mar. 4, 1998

Related U.S. Patent Documents

Reissue of:

[64] Patent No.: 5,637,118
Issued: Jun. 10, 1997
Appl. No.: 268,594
Filed: Jun. 30, 1994

[51] Int. Cl.[6] ..... C10L 1/18

[52] U.S. Cl. ..... 44/364; 534/16

[58] Field of Search ..... 44/364; 534/16

[56] References Cited

U.S. PATENT DOCUMENTS

| | | | |
|---|---|---|---|
| 1,973,320 | 9/1934 | Pacyna | 44/354 |
| 2,086,775 | 7/1937 | Lyons | 44/354 |
| 2,798,789 | 7/1957 | Spedding et al. | 534/16 |
| 2,857,256 | 10/1958 | Walker | 44/354 |
| 2,913,319 | 11/1959 | Trautman | 44/354 |
| 3,205,053 | 9/1965 | McCord | 44/363 |
| 3,332,755 | 7/1967 | Kukin | 44/363 |
| 3,348,932 | 10/1967 | Kukin | 44/354 |
| 3,523,104 | 8/1970 | Dobinson | 534/16 |
| 3,980,449 | 9/1976 | Zetlmeisl | 44/354 |
| 4,251,233 | 2/1981 | Sievers et al. | 44/354 |
| 4,647,293 | 3/1987 | Cahill et al. | 44/366 |
| 4,836,830 | 6/1989 | Gradeff et al. | 44/364 |
| 5,070,072 | 12/1991 | Mir et al. | 428/209 |

*Primary Examiner*—Margaret Medley

[57] ABSTRACT

A corrosion inhibited fuel mixture includes a hydrocarbon fuel, at least one vanadium composition, and a yttrium composition. The concentration of the yttrium composition in the mixture provides at least a stoichiometric amount of yttrium for a substantially complete reaction between the yttrium and $V_2O_5$ formed from the vanadium composition when the mixture is burned. The yttrium and $V_2O_5$ react to form $YVO_4$. One particular yttrium composition useful as a hydrocarbon fuel soluble, water stable vanadium corrosion inhibitor incorporates a yttrium ester having at least four carbon atoms and a hydrocarbon fuel soluble chelating agent that includes 2,4-pentanedi[e]one. The complex has a molar ratio of 2,4-pentanedi[e]one to yttrium of up to 5:1.

13 Claims, No Drawings

VANADIUM CORROSION INHIBITOR

Matter enclosed in heavy brackets [ ] appears in the original patent but forms no part of this reissue specification; matter printed in italics indicates the additions made by reissue.

DESCRIPTION

This invention was made with Government support under contract number N00014-89-C-0053 awarded by the Departmnent of the Navy. The Government has certain rights in this invention.

TECHNICAL FIELD

The present invention is directed to a vanadium corrosion inhibitor, particularly a fuel soluble, water stable vanadium corrosion inhibitor.

BACKGROUND ART

Gas turbine engines serve as principle sources of power in air, marine, and industrial environments. In a gas turbine engine, air is compressed and mixed with a fuel to form a combustible fuel/air mixture. The fuel/air mixture is then burned to produce hot exhaust gas that expands across a turbine to produce power. As with all heat engines, the efficiency of a gas turbine engine is related to the maximum and minimum temperatures in its operating cycle. To increase the efficiency and performance of such engines, therefore, it is desirable to increase the temperature of the exhaust gas at the turbine inlet. The turbine inlet temperature of the exhaust gas in a typical gas turbine engine has increased from about 700° C. in the early 1950s to about 1350° C. in present day engines. The increase in turbine inlet temperature was made possible by advances in metallurgy and component cooling techniques.

As a result of high turbine inlet temperatures, turbine components operate under complex and demanding combinations of stress and temperature in a high-velocity gas stream To withstand such conditions, components in the turbine, particularly the turbine blades, are typically made from nickel-based superalloys. Extensive experience has shown that such alloys provide good resistance to creep, fatigue, and most types of corrosion, which are the principle degradation mechanisms in the hot sections (i.e., the combustion chamber and turbine) of gas turbine engines. The superalloys, however, are vulnerable to hot corrosion, which causes the breakdown of the protective oxide scale ordinarily present on these materials. The breakdown of the protective oxide scale accelerates the rate of consumption of the underlying substrate. Hot corrosion can be promoted by various contaminants present in the fuel and air, such as vanadium (V) and sodium (Na).

Vanadium is not typically found in distillate fuels, such as jet fuels. Therefore, vanadium induced hot corrosion is not a major concern for aircraft gas turbine engines. Vanadium, however, often is present in residual fuel oils, such as those used in marine and industrial gas turbines, and in some crude oils. The vanadium is usually present as a porphyrin or other organometallic complex but inorganic compounds of vanadium also have been reported. During combustion of the fuel, vanadium reacts with oxygen to form oxides. The vanadium-oxygen system comprises at least four oxides, $VO.V_2O_3.V_2O_4(VO_2)$, and $V_2O_5$. The first three oxides are refractory materials that have melting points in excess of 1500° C. As a result, they pass harmlessly through the turbine. $V_2O$, however, has a melting point of about 670° C. Therefore, $V_2O_5$ is a liquid at gas turbine operating temperatures and easily deposits on the surfaces of hot components to cause corrosion.

Sodium vanadate forms when sodium salts, which are present in either the fuel or air (particularly in marine environments react with vanadium oxides. The sodium vanadate phases flux the normally protective oxide scales found on nickel-based superalloys.

Early studies of vanadium hot corrosion recognized that the accelerated oxidation associated with the presence of liquid $V_2O_5$ could be attenuated if the melting point of the reaction products could be raised above the temperature inside a gas turbine engine. Researchers found that certain compounds, such as metal oxides, react with $V_2O_5$ to form refractory vanadates. To date, numerous additives have been evaluated for their effectiveness in inhibiting vanadium hot corrosion. Currently, magnesium-containing compounds (e.g., $MgSO_4$) are widely used in the industry because they can decompose to magnesium oxide (MgO), which in turn reacts with $V_2O_5$ to form magnesium vanadate ($Mg_3(VO_4)_2$). Magnesium vanadate has a melting point of 1150° C. For reasons that are not well understood however, $MgSO_4$ is not particularly effective in inhibiting sodium vanadate corrosion. In addition, sulfur, such as from sodium sulfates in the compressor and $SO_2$ from the fuel, greatly reduces the effectiveness of the MgO formed from $MgSO_4$ because MgO reacts preferentially with the sulfur to form $MgSO_4$ rather than with $V_2O_5$ to form magnesium vanadate.

As a result there is a need for a vanadium corrosion inhibitor that also is effective in the presence of sulfur and against sodium vanadate corrosion.

DISCLOSURE OF THE INVENTION

The present invention is directed to a vanadium corrosion inhibitor that also is effective in the presence of sulfur and against sodium vanadate corrosion.

One aspect of the invention includes a mixture of a hydrocarbon fuel, at least one vanadium composition, and a yttrium composition. The concentration of the yttrium composition in the mixture provides at least a stoichiometric amount of yttrium for a substantially complete reaction between the yttrium and $V_2O_5$ formed from the vanadium composition when the mixture is burned. The yttrium and $V_2O_5$ react to form $YVO_4$.

Another aspect of the invention includes a hydrocarbon fuel soluble, water stable vanadium corrosion inhibitor that incorporates a yttrium ester having at least four carbon atoms and a hydrocarbon fuel soluble chelating agent that includes 2,4-pentanedi[e]one. The complex has a molar ratio of 2,4-pentanedi[e]one to yttrium of up to 5:1.

These and other features and advantages of the present invention will become more apparent from the following description.

BEST MODE FOR CARRYING OUT THE INVENTION

We discovered that yttrium (Y) in the form of yttria ($Y_2O_3$) and other compounds react with $V_2O_5$ to form a refractory vanadate, $YVO_4$. The formation of $YVO_4$, which has a melting point greater than 1800° C., effectively inhibits vanadium hot corrosion in gas turbine engines because $YVO_4$ remains a solid at typical gas turbine operating temperatures. Experimental results have shown that yttrium chloride ($YCl_3$), which reacts with oxygen in combustion air to form $Y_2O_3$, can be an effective fuel oil additive. Although $YCl_3$ is not soluble in hydrocarbon fuels, it is soluble in the water that can be present in many residual fuel oils and crude oils. Even so, using $YCl_3$ as a vanadium corrosion inhibitor can present practical problems. Other yttrium compositions, however, are soluble in hydrocarbon fuels and stable in the presence of water, making them potentially more flexible than $YCl_3$. As a result, this application focusses primarily on fuel soluble yttrium compositions.

We found that a fuel soluble, water stable inhibitor can be made by reacting a yttrium ester with a fuel soluble chelating agent to form an ester/chelating agent complex. In addition to yttrium, the ester should comprise at least four carbon atoms. Preferably, the ester will comprise four to twelve carbon atoms and, most preferably, will be yttrium octonate or yttrium 2-ethyl hexanoate. These esters are preferred because they are oil soluble, hydrolytically stable, and are readily available. The chelating agent should be soluble in the types of hydrocarbon fuels most prone to be associated with vanadium corrosion, such as residual fuel oils or crude oils, and should be reactive with vanadium. The chelating agent that meets these criteria is 2,4-pentanedi[e]one.

The amount of yttrium ester and chelating agent reacted to form the complex can vary over a broad range. For example, the ester/chelating agent complex may comprise up to five moles of chelating agent per mole of yttrium in the ester. Preferably, the complex will comprise two to three moles of chelating agent per mole of yttrium. Most preferably, the complex will comprise three moles of chelating agent per mole of yttrium. The reaction to form the ester/chelating agent complex may take place in a suitable hydrocarbon solvent such as Jet A fuel. No. 2 heating oil (diesel fuel), or another suitable hydrocarbon. For example, 50 g. of $yttrium_{(III)}$ 2-ethyl hexanoate, available from Aldrich Chemical Corporation (St. Louis, Mo.), can be dispersed in 2000 ml of Jet A fuel by stirring at room temperature. 160 ml. of 2,4-pentanedi[e]one may then be added to the yttrium 2-ethyl hexanoate/Jet A mixture and the mixture may be further stirred until all the yttrium ester is dissolved. This produces a clear fuel colored solution containing 3532 ppm yttrium.

We have not identified the exact composition of the resulting ester/chelating agent complex. Moreover, we have not determined if the composition of the complex varies between one that is fuel soluble and one that is water soluble. We have found, however, that in the presence of water no yttria precipitate (ordinarily white) forms in either a fuel layer or a water layer. Without the chelating agent, a white yttria precipitate is formed.

The inhibitor of the present invention may be added to a hydrocarbon fuel in any conventional way. For example, the inhibitor may be mixed with the fuel in a storage tank, while the fuel is conveyed to a gas turbine engine, or in any other suitable way. Preferably, the inhibitor will be thoroughly mixed with the fuel before the fuel is burned to maximize the extent to which the inhibitor will be available to react with $V_2O_5$ when it forms in the engine. The amount of inhibitor added to the fuel should be sufficient to allow a complete reaction between the yttrium in the inhibitor and the $V_2O_5$ that forms when the fuel burns. Therefore, the amount of yttrium added to the fuel should at least equal the stoichiometric amount required for a complete reaction with the $V_2O_5$. This result can be ensured by providing sufficient yttrium to react with all the vanadium in the fuel. Preferably, the amount of yttrium will be at least 125% of the stoichiometric amount required for a complete reaction between the yttrium and vanadium. Most preferably, the amount of yttrium will be at least 150% of the stoichiometric amount required for a complete reaction between the yttrium and vanadium. For example, an amount of inhibitor that provides 550 parts per million (ppm) of yttrium when mixed with a fuel is sufficient to prevent vanadium corrosion in a fuel that contains 300 ppm vanadium.

The following examples demonstrate the present invention without limiting the invention's broad scope.

EXAMPLE 1

(Stability of $YVO_4$ in the presence of $Na_2SO_4$)

A yttria ($Y_2O_3$) disc was immersed in molten $V_2O_5$ and allowed to react for approximately two hours to form $YVO_4$. $YVO_4$ was confirmed from x-ray diffraction analysis. The $YVO_4$-coated disc was covered with sodium sulfate and exposed in air at 900° C. for two hours. After exposure, the sulfate coated specimen was immersed into hot water and the solution analyzed for soluble sodium, vanadium, and sulfate. The results are shown in Table 1. Essentially, all the sodium sulfate applied to the disc was recovered, indicating little or no reaction between the $YVO_4$ and sodium sulfate. No soluble vanadium was observed. Based upon these results, we concluded that $YVO_4$ is stable in the presence of $Na_2SO_4$.

TABLE 1

| Element | Amount Applied to Disk micromoles | Amount Recovered from Disk micromoles |
|---|---|---|
| Sodium | 7 | 6.3 |
| Sulfur | 3.5 | 2.9 |
| Vanadium | 0 | 0 |

EXAMPLE 2

(Demonstration of $YCl_3$ as a Corrosion Inhibitor)

A laboratory jet burner rig was modified so that a hypodermic needle could spray an aqueous solution of vanadyl sulfate ($VOSO_4$) into the exit nozzle of the burner. The $VOSO_4$ decomposes to $SO_3$ and $V_2O_5$ at about 400° C. to simulate the formation of $V_2O_5$ in a full-size gas turbine engine. Nickel-based superalloy specimens were placed downstream of the burner's exit nozzle to simulate turbine components. The concentration of the $VOSO_4$ in the burner exhaust and the distance the $VOSO_4$ traveled within the flame before impinging on the superalloy specimens were experimentally determined such that all the $V_2O_5$ that contacted the specimens was liquid. The tests were performed under the following conditions:

| | |
|---|---|
| Fuel: | Jet A |
| Fuel Flow Rate: | 7.4 kg/hr |
| Air/Fuel Ratio: | 20:1 |
| Test Temperature: | 900° C. |
| Test Duration: | 6 hr |

In a first series of tests, the superalloy specimens were exposed only to $V_2O_5$. Within a few hours, the molten $V_2O_5$ severely corroded the specimens.

In a second series of tests, $YCl_3$ was added to the solution of $VOSO_4$. The concentration of yttrium in the solution was exactly that necessary to react with the vanadium to form $YVO_4$. In the presence of the yttrium, a thin deposit of $YVO_4$ formed on the surface of the specimens. Substantially no corrosion was observed on the specimens.

In a last series of tests, $Na_2SO_4$ was added to the $VOSO_4$/$YCl_3$ solution to simulate a sulfidation environment. The $Na_2SO_4$ did not alter test results. As in the second series of test, no corrosion was observed. There was no evidence that the presence of the $Na_2SO_4$ prevented or interfered with the attenuation of $V_2O_5$ corrosion by yttria.

These tests showed that yttrium can effectively inhibit vanadium hot corrosion in the presence of vanadium alone and vanadium plus sulfates.

EXAMPLE 3

(Stability of Ester/Chelate Complex in Water)

A mixture of Jet A fuel and yttrium$_{(111)}$ 2-ethyl hexanoate (Aldrich Chemical Corp., St. Louis, Mo.) was formed by adding 2000 ml of Jet A fuel and 50 g of yttrium$_{(111)}$ 2-ethyl hexanoate to a 4000 ml. flask. After stirring the mixture stirred on a magnetic hot plate (no heat). 160 ml. of 2,4-pentanedi[e]one was added to the flask. This mixture was stirred until all the yttrium ester was dissolved, producing a clear fuel colored solution. The solution contained 3532 ppm yttrium. Adding water to the flask formed two clear layers one fuel, the other water. Both layers contained yttrium. The distribution of yttrium between the two layers was related to the volume of the two fluids. No yttria precipitate (ordinarily white) was observed in either the fuel layer or water layer. Previously, such a precipitate was observed without the chelating agent.

A second water extraction showed that very little (~1%) of the yttrium complex remaining in the fuel went into the water layer. As before, there was no white yttria precipitate. This result indicated that there are several different ester/chelate species formed during the reaction, some water soluble and some fuel soluble. All species appeared to be stable in water.

EXAMPLE 4

(Demonstration of Ester/Chelate Complex as a Corrosion Inhibitor)

Example 2 was repeated with the yttrium ester/chelate complex formed in Example 3 substituted for the $YCl_3$. For several of the tests, sodium was introduced into the combustor in the form of sodium sulfate. The results of these tests are shown in Table II.

TABLE II

| Test | Corrodent | Corrodent Concentration ppm | Inhibitor | Inhibitor Concentration ppm | Comments |
|---|---|---|---|---|---|
| 1 | none | — | ester/chelate complex | 550 | no deposit |
| 2 | vanadium | 300 | none | — | corrosion |
| 3 | sodium | 33 | none | — | corrosion |
| 4 | sodium | 100 | none | — | corrosion |
| 5 | vanadium | 300 | ester/chelate complex | 550 | no corrosion |
| 6 | vanadium sodium | 300 33 | ester/chelate complex | 550 | no corrosion |
| 7 | vanadium sodium | 300 100 | ester/chelate complex | 550 | no corrosion |

In test 1 (inhibitor, no corrodent), the inhibitor formed an extremely thin, whitish, non-adherent film on the surface of the specimens.

In tests 2–4 (corrodent, no inhibitor), a thick, non-adherent purple scale, which exfoliated during cool-down from test to room temperature, formed.

In tests 5–7 (corrodent, inhibitor), a thin, grayish, non-adherent film covered the surfaces of the specimens. Visually ally the surfaces appeared free of corrosion. This was confirmed from metallographical studies.

These tests showed that yttrium can effectively inhibit vanadium hot corrosion in the presence of vanadium alone, sodium alone, and vanadium plus sodium.

The results of the examples, particularly Examples 2 and 4 show that the vanadium corrosion inhibitor of the present invention provides several benefits over the prior art. Unlike the prior art magnesium-based inhibitors, the yttrium-based inhibitors of the present invention are effective with vanadium alone and in the presence of sodium and sulfates. In addition, the yttrium-based inhibitors produce a reaction product, $YVO_4$ (melting point>1800° C.), with a higher melting point than the reaction product of magnesium-based inhibitors, $Mg_3(VO_4)_2$ (melting point=1150° C.). As a result, the corrosion inhibitors of the present invention can be used for higher temperature applications that the prior art corrosion inhibitors.

We claim:

1. A fuel mixture comprising a hydrocarbon fuel and a yttrium ester/chelate complex, wherein when the hydrocarbon fuel is burned, $V_2O_5$ is a by-product, and wherein the concentration of the yttrium complex in the mixture provides at least a stoichiometric amount of yttrium for a substantially complete reaction between the yttrium and $V_2O_5$ whereby the yttrium and $V_2O_5$ react to form $YVO_4$.

2. The mixture of claim 1, wherein the concentration of the yttrium complex in the mixture provides at least 125% of the stoichiometric amount of yttrium required for a substantially complete reaction between the yttrium and vanadium.

3. The mixture of claim 1, wherein the yttrium ester comprises at least four carbon atoms and the chelating agent is hydrocarbon fuel soluble and that includes 2,4-pentanedi[e]one and the complex has a molar ratio of 2,4-pentanedi[e]one to yttrium of up to 5:1.

4. The mixture of claim 3, wherein the yttrium ester comprises four to twelve carbon atoms.

5. The mixture of claim 3, wherein the yttrium ester is selected from the group consisting of yttrium octonate and yttrium 2-ethyl hexanoate.

6. The mixture of claim 3, wherein the molar ratio of 2,4-pentanedi[e]one to yttrium is 2:1 to 3:1.

7. The mixture of claim 3, wherein the yttrium ester is selected from the group consisting of yttrium octonate and yttrium 2-ethyl hexanoate and the molar ratio of 2,4-pentanedi[e]one to yttrium is 2:1 to 3:1.

8. A hydrocarbon fuel soluble, water stable vanadium corrosion inhibitor yttrium ester chelate complex, comprising a yttrium ester having at least four carbon atoms and a hydrocarbon fuel soluble chelating agent that includes 2,4-pentanedi[e]one wherein the complex has a molar ratio of 2,4-pentanedi[e]one to yttrium of up to 5:1.

9. The inhibitor of claim 8, wherein the yttrium ester comprises four to twelve carbon atoms.

10. The inhibitor of claim 8, wherein the yttrium ester is selected from the group consisting of yttrium octonate and yttrium 2-ethyl hexanoate.

11. The inhibitor of claim 8, wherein the molar ratio of 2,4-pentanedi[e]one to yttrium is 2:1 to 3:1.

12. The mixture of claim 9, wherein the molar ratio of 2,4-pentanedi[e]one to yttrium is 2:1 to 3:1.

13. The mixture of claim 10, wherein the molar ratio of 2,4-pentanedi[e]one to yttrium is 2:1 to 3:1.

* * * * *